(12) United States Patent
Onikiri et al.

(10) Patent No.: US 6,193,383 B1
(45) Date of Patent: Feb. 27, 2001

(54) LINEAR LIGHT SOURCE UNIT

(75) Inventors: Akira Onikiri; Takashi Shimura, both of Yamanashi-ken (JP)

(73) Assignee: Citizen Electronics Co., Ltd., Fujiyoshida (JP)

( * ) Notice: Subject to any disclaimer, the term of this patent is extended or adjusted under 35 U.S.C. 154(b) by 0 days.

(21) Appl. No.: 09/275,031

(22) Filed: Mar. 24, 1999

(30) Foreign Application Priority Data

Mar. 27, 1998 (JP) .................................................. 10-098124

(51) Int. Cl.⁷ .................................................. G01D 11/28
(52) U.S. Cl. .................................. 362/26; 362/327; 362/31
(58) Field of Search .................................. 362/326, 327, 362/330, 298, 299, 300, 23, 26, 29, 28, 31; 40/546; 349/65, 63, 62

(56) References Cited

U.S. PATENT DOCUMENTS

| | | | |
|---|---|---|---|
| 4,630,895 | * 12/1986 | Abdala | 349/65 |
| 4,729,185 | * 3/1988 | Baba | 40/546 |
| 4,929,062 | * 5/1990 | Guzik | 349/65 |
| 5,197,792 | * 3/1993 | Jiao et al. | 362/31 |
| 5,414,598 | * 5/1995 | Anderson | 362/26 |
| 5,833,517 | * 11/1998 | Konda | 451/29 |
| 5,876,107 | * 3/1999 | Parker | 362/31 |

FOREIGN PATENT DOCUMENTS

| | | |
|---|---|---|
| 0732679 | 9/1996 | (EP) . |
| 2270409 | 3/1994 | (GB) . |

* cited by examiner

*Primary Examiner*—Sandra O'Shea
*Assistant Examiner*—Hargobind S. Sawhney
(74) *Attorney, Agent, or Firm*—Dennison, Scheiner, Schultz & Wakeman

(57) ABSTRACT

An elongated transparent light leading member is provided above a light source, leading member is provided opposite to the light source and a hole is formed in the light leading member at a position above the light source. The hole has an inverted triangular shape, opposite sides of the hole are provided for reflecting light beams emitted from the light source in a longitudinal direction of the light leading member.

6 Claims, 4 Drawing Sheets

LINEAR LIGHT SOURCE UNIT

BACKGROUND OF THE INVENTION

The present invention relates to a linear light source unit for emitting a linear light beam, which unit is used in a facsimile transmitter, copy machine, image scanner, barcode reader, and others, as a light source for reading images.

In recent years, the light emitting diode (LED) is widely used as a light source for reading the image in a personal facsimile. This tendency is caused by the facts that the LED is suitable for miniaturizing the device, necessary light quantity reduces because the sensitivity of the CCD type sensor is increased, and hence the number of used LED reduces, which causes the manufacturing cost of the device to decrease.

In the linear light source unit, a light leading member is provided for leading the light beam to a linear light beam.

FIG. 8 is a perspective view showing a conventional linear light source unit. In FIG. 8, reference numeral 20 designates a linear light source unit which comprises a transparent light leading member 21 made of plastic and formed into a flat plate, and a plurality of LEDs 23 linearly mounted on a print substrate 22. In order to uniformly distribute light quantity on the LED arranged line, an incidence portion 21b of the light leading member is formed into a semicircular shape, inclined walls 21c are formed on both sides to form guide surfaces, and a light discharge surface 21a is formed into a saw teeth surface or embossing surface. Namely, the distribution of quantity of light is adjusted by using diffusion, refraction and reflection of light.

However, the above described conventional linear light source unit can not achieve a uniform light distribution, and has a problem that an immediately upper portion of the light source becomes most bright.

In addition, in order to improve the uniformity of the light quantity, a plurality of LEDs must be provided, which results in increase of the manufacturing cost of the linear light source unit.

SUMMARY OF THE INVENTION

An object of the present invention is to provide a linear light source unit which may uniformly irradiate a long linear portion with a small number of LEDs, thereby reducing the size of the unit and the manufacturing cost thereof.

According to the present invention, there is provided a linear light source unit comprising, at least one light source, an elongated transparent light leading member provided above the light source, an incidence surface formed in the light leading member opposite to the light source, at least one central hole formed in the light leading member at a position above the light source, the hole having an inverted triangular shape, opposite sides of the hole being provided for reflecting light beams emitted from the light source in a longitudinal direction of the light leading member.

The light leading member has opposite reflecting surfaces radially extending and expanding from the incidence portion.

The incidence surface has a semicircular shape in section.

Each of the opposite sides of the hole is formed by a part of a parabolic line surface.

A plurality of side holes are formed in the light leading member at opposite sides of the central hole.

A pair of notches are also formed in the light leading member at opposite sides of the incidence surfaces.

These and other objects and features of the present invention will become more apparent from the following detailed description with reference to the accompanying drawings.

DETAILED DESCRIPTION OF THE PREFERRED EMBODIMENT

Figure 1:
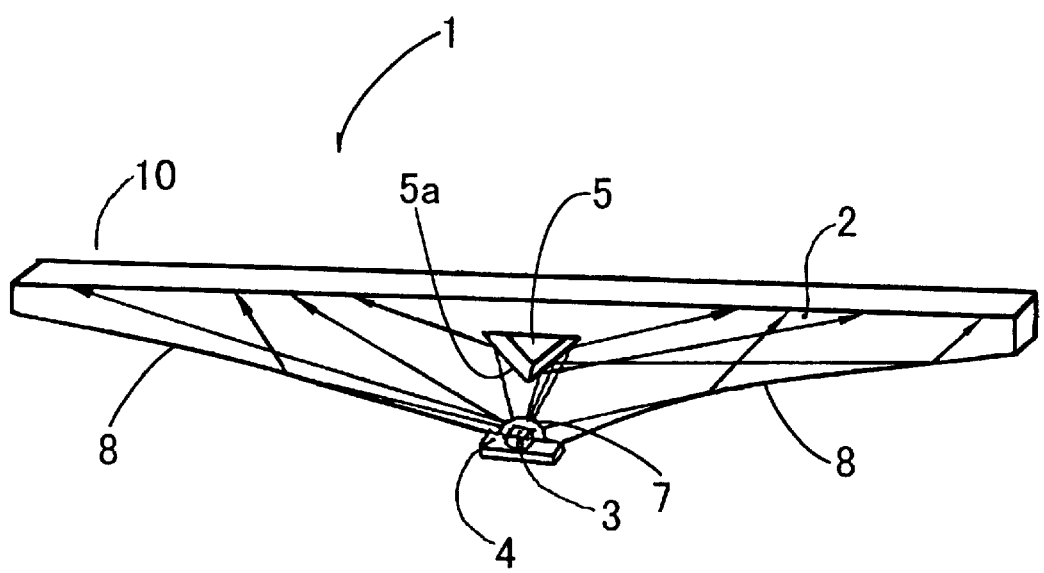
FIG. 1 is a perspective view showing a linear light source unit in a first embodiment of the present invention.

Referring to FIG. 1 showing the first embodiment of the present invention, a linear light source unit 1 comprises an elongated transparent light leading plate member 2 made of plastic and formed into a flat elongated plate, and an LED 3 mounted on a print substrate 4 as a light source. The LED 3 is located at a central position with respect to the longitudinal direction of the light leading member 2.

The light leading member 2 has a central through hole 5 at an immediately upper position of the LED 3. The hole 5 has a substantially inverted triangular shape. An incidence surface 7 having a semicircular shape section is formed in the light leading member 2 surrounding the LED 3. The light leading member 2 has a pair of opposite reflecting surfaces 8 radially extending and expanding from the incidence surface 7 to form a radial reflection surface. The hole 5 has a pair of parabolic reflection surfaces 5a radially extending from a lower vertex.

A light discharge surface 10 is formed into a saw teeth surface or embossing surface as in the conventional unit.

Figure 2:
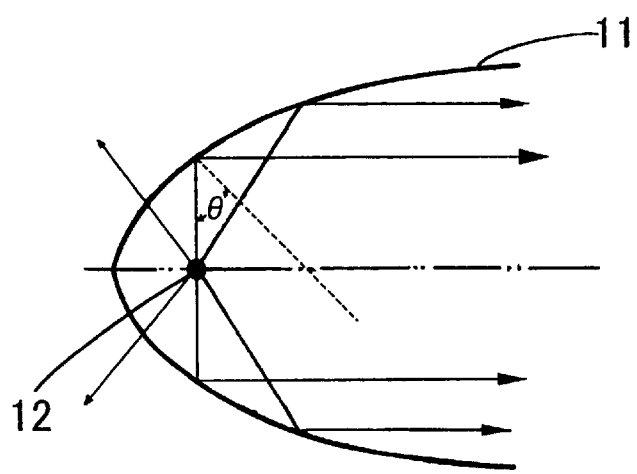
FIG. 2 is an illustration explaining light paths by a parabolic surface.

FIG. 2 shows condition of reflection and refraction of light on a parabolic surface 11. Light beams emitted from a focus 12 are reflected from the parabolic surface to form parallel lightbeams. The lightbeam tobe reflected must have an incident angle larger than the critical angle θ. The critical angle θ is 38°<θ<48°. Plastic as an optical material has a refraction n, 1.4<n <1.6 and has a critical angle 39°<θ<46°.

Figure 3:
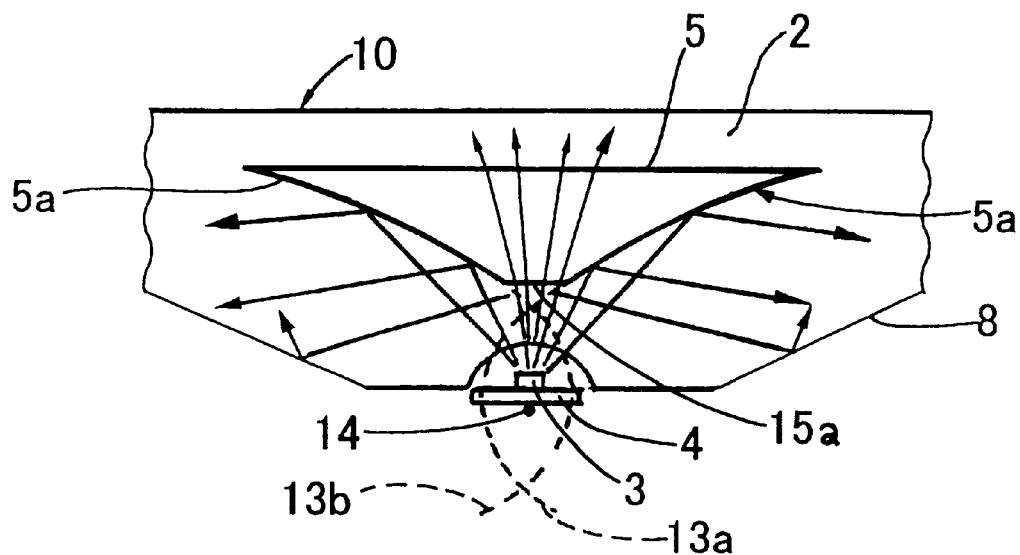
FIG. 3 is a front view showing light paths in the unit of FIG. 1.

Referring to FIG. 3, each of the parabolic reflection surfaces 5a is properly selected from a parabolic line 13a, 13b, so that light beams from the LED 3 may be reflected without uselessness. Furthermore, the LED 3 is located at a common focus 14 of both parabolic lines 13a and 13b or at a position adjacent the focus so that the light beams are further effectively reflected.

However, the light is entirely reflected from the reflection surfaces 5a, the light quantity discharged from a region immediately upper portion of the LED decreases, rendering an irradiated surface dark. In order to remove such a defect, a flat surface 15a is formed above the LED, so that the hole has a trapezoid shape. Thus light beams pass though the flat surface 15a without reflecting as shown.

Figure 4:
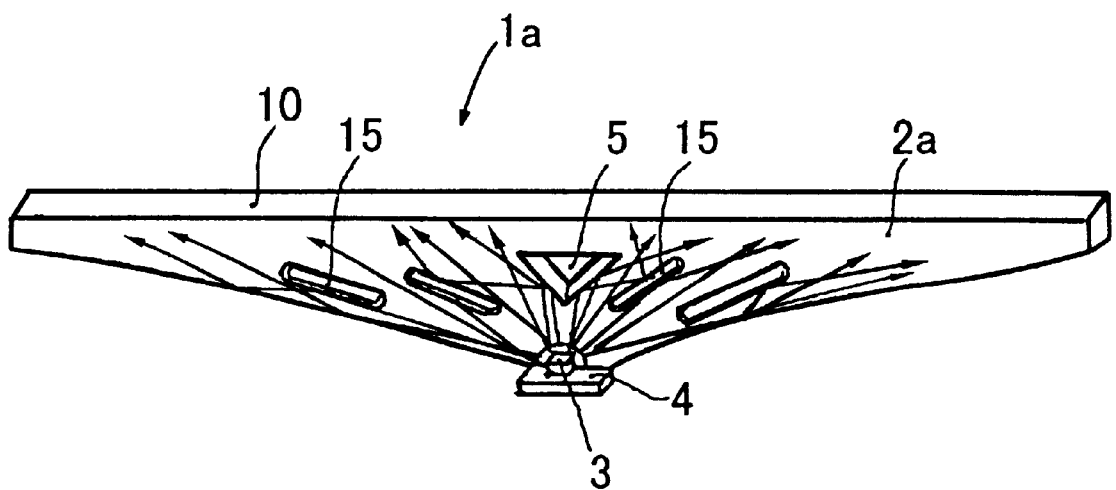
FIG. 4 is a perspective view showing a second embodiment of the present invention.
Figure 5:
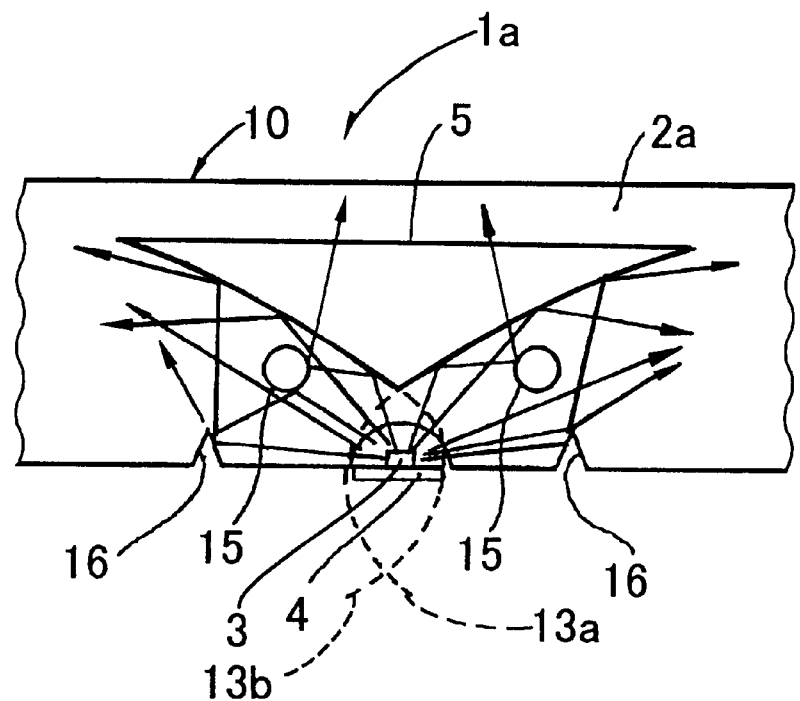
FIG. 5 is a front view showing light paths in the unit of FIG. 4.

Referring to FIGS. 4 and 5 showing the second embodiment of the present invention, a linear light source unit 1a has a plurality of cylindrical side holes 15 properly disposed with respect to the hole 5, and a pair of notches 16 formed in the bottom of a light leading member 2a at both sides of the LED 3.

By the hole 5, holes 15 and notches 16, light beams are reflected in various directions, so that the light beams are uniformly discharged from the light discharge surface 10 including an area above LED 3.

Figure 6:
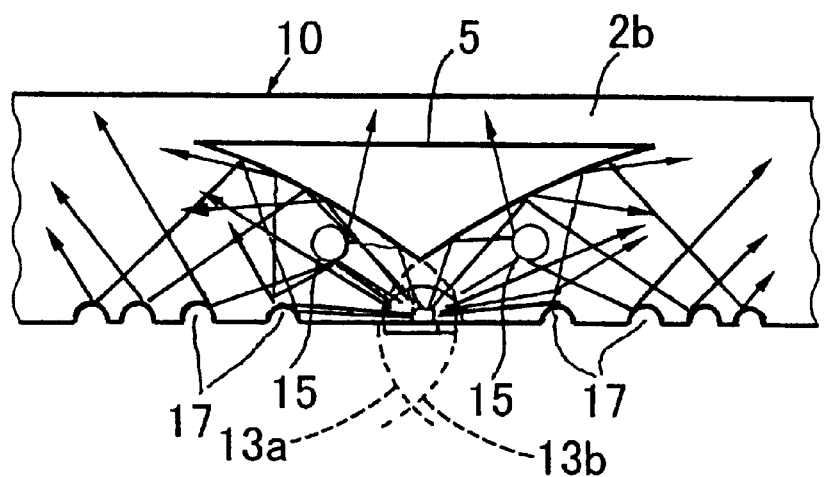
FIG. 6 is a front view showing a third embodiment of the present invention.

FIG. 6 shows the third embodiment of the present invention. In the unit, a plurality of recesses 17, each having a semicircular shape in cross section, are formed in the bottom of a light leading member 2b at both sides of the LED. The distance between the recesses 17 reduces as apart from the LED.

In accordance with the third embodiment, the light distribution becomes more uniform.

Figure 7:
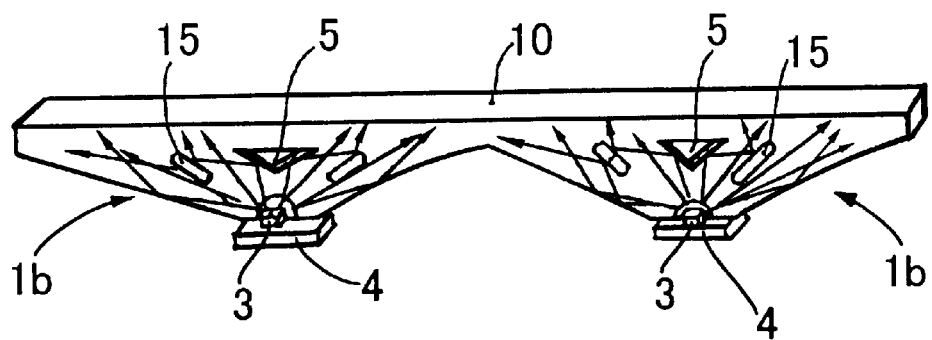
FIG. 7 is a perspective view showing a fourth embodiment of the present invention.
Figure 8:
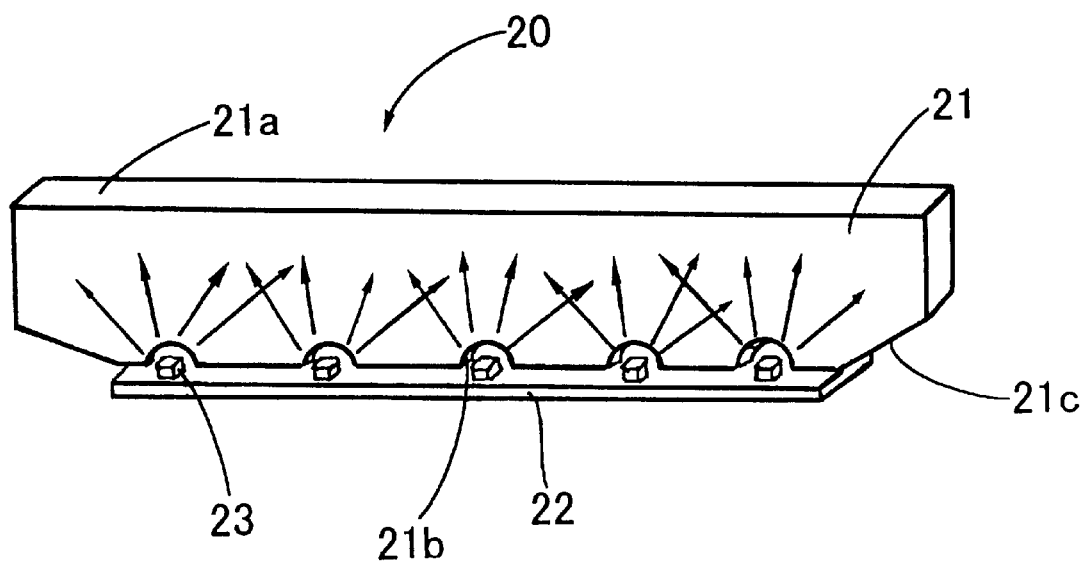
FIG. 8 is a perspective view showing a conventional linear light source unit.

Referring to FIG. 7 showing the fourth embodiment, a plurality of linear light source units 1b are continuously disposed in the longitudinal direction. The unit 1b has the same construction as the second embodiment 1a shown in FIGS. 4 and 5. Therefore, the same reference numeral as FIGS. 4 and 5 are used.

In accordance with the fourth embodiment, a long area can be uniformly irradiated.

Although the LED is used in the above described embodiments, other light sources such as the fluorescent lamp can be used.

In accordance with the present invention, at least one hole is formed in the transparent light leading member at a position above a light source. Light beams emitted from the light source is linearly and uniformly diffused by reflection and refraction at the hole. By changing the shape and the number of holes, the radiating direction of the light beams can be properly justed.

Thus, it is possible to uniformly irradiate a long area by a small number of the light sources. As a result, the manufacturing cost of the linear light source unit can be reduced, the unit can be miniaturized.

While the invention has been described in conjunction with preferred specific embodiment thereof, it will be understood that this description is intended to illustrate and not limit the scope of the invention, which is defined by the following claims.

What is claimed is:

1. A linear light source unit comprising:

at least one light source;

an elongated transparent light leading member provided above the light source;

an incidence surface formed in the light leading member opposite to the light source;

at least one central hole perforating through the light leading member at a position above the light source;

the hole having an inverted trapezoid shape, opposite sides of the hole being provided for reflecting light beams emitted from the light source in a longitudinal direction of the light leading member, and having a flat surface opposite the light source; and, a plurality of side holes formed in the light leading member at opposite sides of the central hole.

2. The linear light source unit according to claim 1 wherein the light leading member has opposite reflecting surfaces radially extending and expanding from the incidence portion.

3. The linear light source unit according to claim 1 wherein the incidence surface has a semicircular shape in section.

4. The linear light source unit according to claim 1 wherein each of the opposite sides of the hole is formed by a part of a parabolic line surface.

5. The linear light source unit according to claim 1 further comprises at least a pair of notches formed in the light leading member at opposite sides of the incidence surfaces.

6. The linear light source unit according to claim 1 further comprises a pair of recesses formed in the light leading member at opposite sides of the incidence surface.

* * * * *